(No Model.)

A. EAGLE.
HAY RAKE AND TEDDER.

No. 256,134. Patented Apr. 11, 1882.

WITNESSES:

INVENTOR:
Alburtis Eagle,
ATTORNEY.

UNITED STATES PATENT OFFICE.

ALBURTIS EAGLE, OF NEWTOWN, PENNSYLVANIA.

HAY RAKE AND TEDDER.

SPECIFICATION forming part of Letters Patent No. 256,134, dated April 11, 1882.

Application filed December 17, 1881. (No model.)

*To all whom it may concern:*

Be it known that I, ALBURTIS EAGLE, a citizen of the United States, residing at Newtown, in the county of Bucks and State of Pennsylvania, have invented a new and useful Improvement in Hay Rakes and Tedders, which improvement is fully set forth in the following specification and accompanying drawings, in which—

Figure 1:
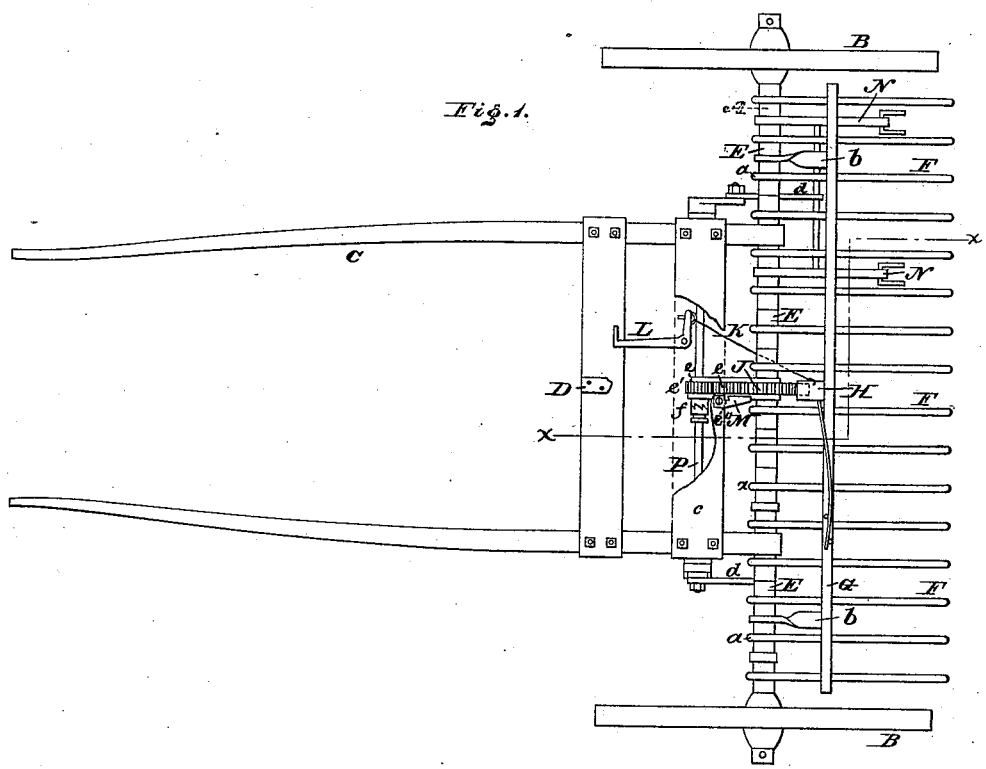
Figure 2:
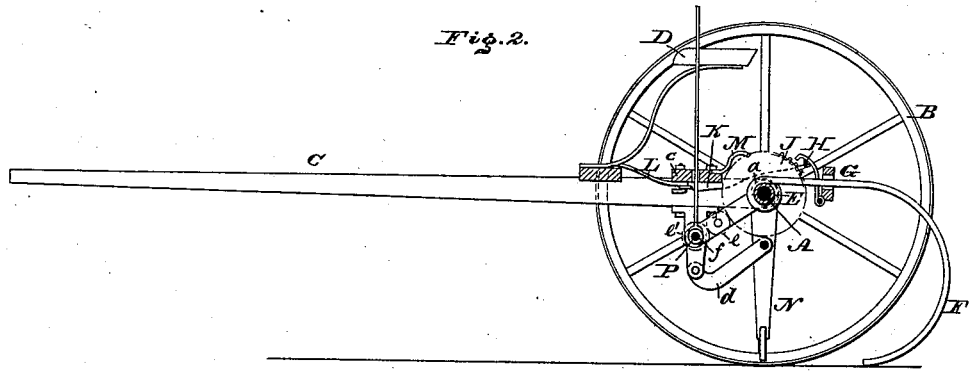
Figure 3:
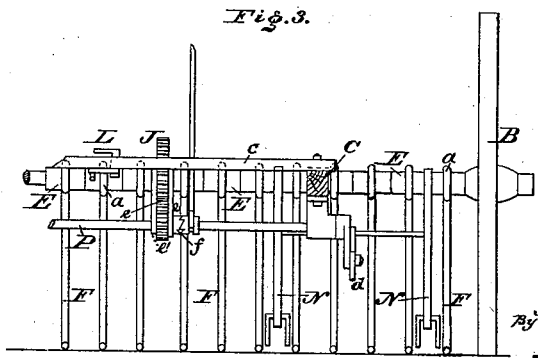

Figure 1 is a top or plan view of the hay rake and tedder embodying my invention. Fig. 2 is a vertical section thereof in line *x x*, Fig. 1. Fig. 3 is a front view of a portion thereof.

Similar letters of reference indicate corresponding parts in the several figures.

My invention consists of a hay rake and tedder constructed as hereinafter fully set forth, whereby the device is simple, inexpensive, strong, durable, and easily operated.

Referring to the drawings, A represents the axle, to which the wheels B are rigidly connected, and C represents the shafts, whose rear ends are pivoted to said axle and sustain the driver's seat D.

Fitted loosely on the axle A is a series of sleeves, E, to which are connected or which are encircled by the heads *a* of the rake-teeth F, the lifting-bar G whereof, which is connected to the axle A by straps *b*, pivoted to said axle, carries a spring-catch, H, whose nose or hooked end is adapted to engage with a spur-wheel, J, which is rigidly connected to the axle A, preferably at the middle thereof, said catch having attached to it a cord or chain, K, which is connected to a lever or treadle, L, the latter being pivoted to the connecting-piece *c* of the shafts C, and conveniently accessible to the feet of the driver. Projecting rearward from said piece *c* is a throw-off arm, M, so disposed near the spur-wheel J that it may be struck by the catch H, said arm M being at the side of said wheel J, and the catch H being sufficiently broad that while it may engage with the spur-wheel J it may also ride upon the arm M when carried forward by said wheel. The catch H overhangs the spur-wheel J, so that it may be quickly lowered and its nose engage with the teeth of said wheel. The width of the catch is sufficient to overlap or extend beyond the side of said wheel and present a surface which may ride upon the arm M when carried forward by said wheel, and thereby cause the disengagement of the catch H and spur-wheel, or the throw-off of the said catch, as has been stated, thus simplifying the construction and operation of this part of the device.

N represents a series of tedder-arms, which separate from the rake-teeth, are pivoted to the axle A, and connected by arms *d* to a crank-shaft, P, which is mounted in the rear of the shafts C and operated by means of gearing *e*, which is supported on straps *e'*, which are fitted on the axle A and crank-shaft P, one of the wheels of the gearing *e* being an idler, which is interposed between and gears with the front wheel of said gearing and the spur-wheel J, said crank-shaft having a clutch, *f*, whereby the tedder-arms may be rendered inoperative.

It will be seen that when service of the rake is required the tedder is thrown out of gear. When the rake-teeth are to be cleared of hay the driver operates the lever or treadle L, whereby the catch H is forced to an engaging contact with the spur-wheel J, and the bar G is thereby lifted, and with it the rake-teeth. When the catch H strikes the arm M it is raised clear of the teeth of the spur-wheel, and when the operator lets go the lever or treadle L the rake-teeth fall. Should the lever or treadle L be held or controlled by the driver's foot, the rake-teeth will remain inoperative, and the tedder may then render service, in which case the clutch *f* is shifted in order to impart the power of the axle through the gearing J *e* to the crank-shaft P, whereby, by means of the arms *d*, motion is imparted to the tedder-arms, and the tedder is thus operated.

On the side of the forward end of the arm M is a notch, *e''*, (see Fig. 1,) whereby when the tedder is raised the nose of the catch H may be inserted in said notch, thus locking the catch with said plate and holding the rake-teeth elevated, the clutch being thrown out of gear, thus preventing the teeth being dragged along the ground, especially when their service is not required.

It will be seen that the rake-teeth F, tedder-arms N, shafts C, and the spur-wheel J are all on the axle A, whereby there is a compactness of parts which simplifies the device and renders it strong, durable, and inexpensive, and the power of the axle may be quickly and easily communicated to the rake-teeth and tedder-arms.

Having thus described my invention, what I claim as new, and desire to secure by Letters Patent, is—

1. The axle, in combination with the series of rake-teeth and separate series of tedder-arms hung on said axle, substantially as and for the purpose set forth.

2. The axle, in combination with the series of rake-teeth, the separate series of tedder-arms, and the rigid spur-wheel, all on said axle, substantially as and for the purpose set forth.

3. The axle, the rake-teeth, and the lifting-bar, in combination with the spring-catch H, the spur-wheel J, and arm M, said spur-wheel being fixed to the axle, the throw-off arm extending outward at the side of the spur-wheel, and the spring-catch being pivoted to the lifting-bar, overhanging the spur-wheel, and extended beyond the side of said wheel, substantially as and for the purpose set forth.

4. The rake-teeth, spur-wheel, and catch H, in combination with the arm M, having a notch, $e''$, substantially as and for the purpose set forth.

5. The axle A, rake-teeth F, the spur-wheel J, gearing $e$, straps $e'$, crank-shaft P, arms $d$, and tedder-arms N, combined and operating substantially as and for the purpose set forth.

ALBURTIS EAGLE.

Witnesses:
JOHN A. WIEDERSHEIM,
W. F. KIRCHER.